Feb. 7, 1967 T. E. BJORN 3,303,511
WHEEL ALIGNMENT REGISTER
Filed Sept. 28, 1964 2 Sheets-Sheet 1
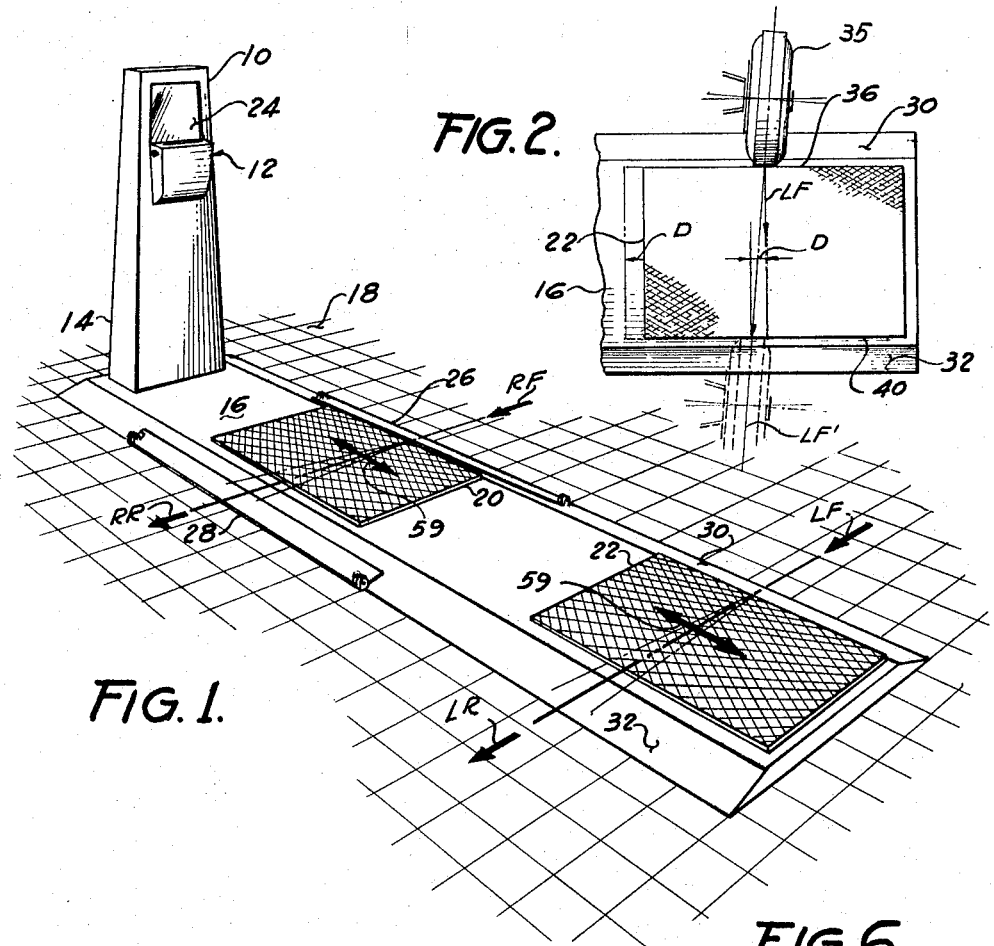
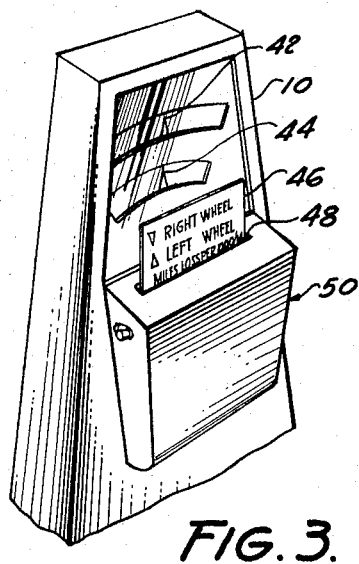
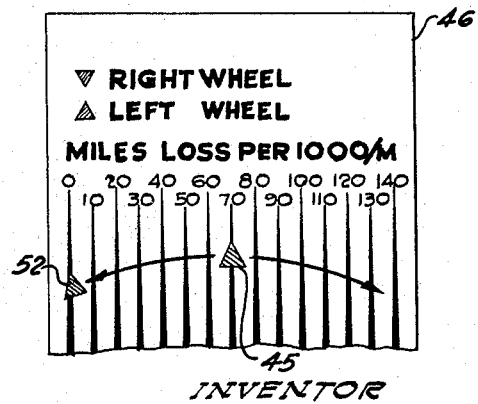
INVENTOR
THOMAS E. BJORN.

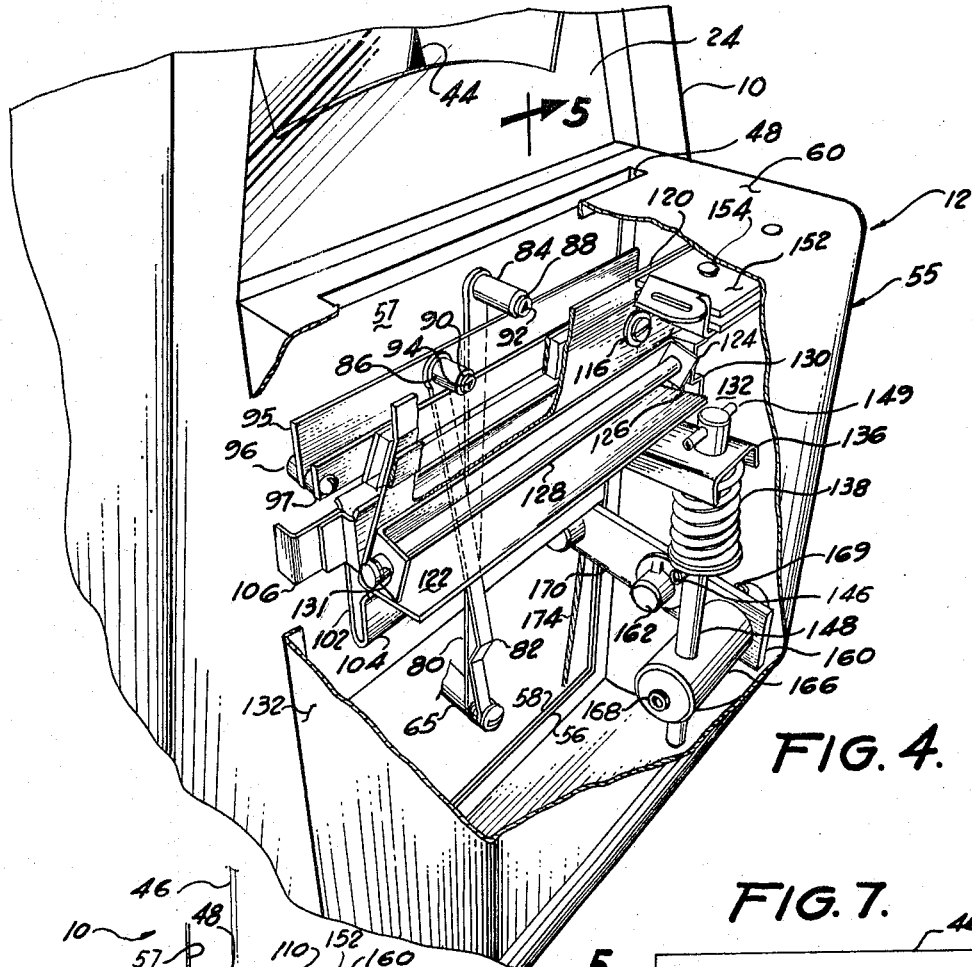
FIG. 4.
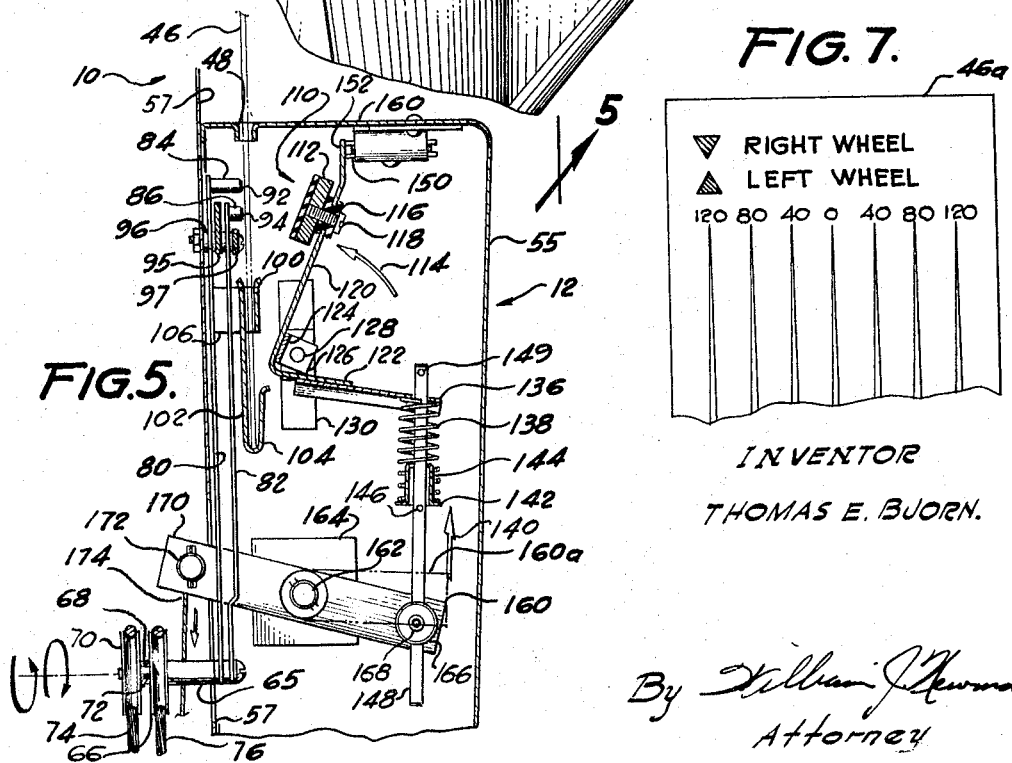
FIG. 5.
FIG. 7.
▽ RIGHT WHEEL
△ LEFT WHEEL
120 80 40 0 40 80 120
INVENTOR
THOMAS E. BJORN.
By William J. Newman
Attorney United States Patent Office 3,303,511
Patented Feb. 7, 1967

3,303,511
WHEEL ALIGNMENT REGISTER
Thomas E. Bjorn, Northbrook, Ill., assignor to Stewart-Warner Corporation, Chicago, Ill., a corporation of Virginia
Filed Sept. 28, 1964, Ser. No. 399,641
9 Claims. (Cl. 346—50)

The present invention relates to improvements in apparatus for registering the alignment of vehicle wheels. More particularly, the invention relates to apparatus adapted for attachment to presently known and used alignment indicating devices and still more particularly relates to apparatus for marking indicia on a card to provide a permanent record of the condition of alignment of wheels at the time a test is made.

It is well known that deterioration of automobile and other vehicle tires is caused to a considerable extent by scuffing. Mechanical scuffing is the drag on the periphery of a wheel by the surface over which it travels when the plane of rotation of the wheel is not exactly parallel to its line of travel. This condition exists in an automobile or other vehicle when its front and/or back wheels are not properly set to rotate in parallel planes and the deviation of the wheels from such parallel position is generally referred to as "toe-in" or "toe-out."

Many instruments have been developed for indicating wheel misalignment and one of the more prevalent types is that known in the trade as a "scuff board." These devices are operable responsive to a vehicle moving thereover with the forces on the wheel caused by their misalignment operating an indicator device to provide a reading of the amount of misalignment.

Generally the scuff board wheel alignment testers employ an elongated platform having a pair of movable plates or the like extending across the line of travel of the vehicle to be tested so each of a set of front or back wheels simultaneously engage one of the plates. The plates are adapted to be moved in a direction transverse to the forward motion of the vehicle upon engagement of the wheels with the respective plates. The plates are adapted to be moved separately by their respective wheels by a camming action as the wheels roll over the plates and are moved to the degree that the vehicle wheels are misaligned from their parallel positions. Suitable linkage means are provided to translate the transverse movement of the plates to an indicating device whereby a pair of pointers, or the like, are moved to indicate the degree of misalignment in terms of any suitable measure such as degrees of misalignment or tire wear per mile, etc.

The invention herein comprises apparatus for providing a permanent record to the vehicle owner of the amount of wheel misalignment. It may be seen that this provides an attractive merchandising device for service stations and garages wherein a vehicle owner or operator drives his vehicle over the scuff board and is provided immediately with a card on which is recorded the alignment condition of his wheels. The particular apparatus herein disclosed is characterized by the fact that the card marking parts are of very low inertia so that its operation will not materially affect the accuracy of the alignment indicating device. It is also characterized by the fact that it is ruggedly constructed and suitable for extended merchandising use, yet relatively inexpensive in cost.

It is a broad object of the present invention to provide an improved wheel alignment register. A further object in keeping with the preceding object is to provide an improved wheel alignment register that provides a permanent record.

Another object in keeping with each of the preceding objects is to provide apparatus for wheel aligning indicating devices constructed to render temporary readings, with an attachment for rendering printed permanent registration of wheel misalignment.

Another object of the invention is to provide a device that can be adapted to presently known and used wheel aligning indicating devices.

In addition, it is an object of this invention to provide an apparatus for rendering printed permanent registration of wheel alignment which is rugged and economic.

The foregoing and other objects, features and advantages of the present invention reside in details of construction and arrangement of parts, and will be either obvious or pointed out in the following specification and claims when read in view of the accompanying drawings, in which:

FIG. 1 is a perspective view of a wheel alignment tester of the "scuff board" type with apparatus for rendering permanent records of wheel misalignment included thereon;

FIG. 2 is a diagrammatic view representative of movement of parts and tire areas in an alignment test;

FIG. 3 is an enlarged view of the top of the standard indicated in FIG. 1;

FIG. 4 is a partial perspective view, with certain parts broken away to show details of construction of the recording mechanism;

FIG. 5 is a partial sectional view taken approximately along lines 5—5 of FIG. 4;

FIG. 6 is a diagrammatic view of a card, suitable for use in the apparatus, and showing indicia thereon uttered by the apparatus of this invention; and FIG. 7 is a view of a different form of card usable in another form of apparatus.

FIG. 1 shows an indicating standard 10, that may be of any of well known kinds, to which is attached in suitable position a recording apparatus 12 of this invention. The details of construction and operation of the apparatus will be set out more fully hereinbelow. The standard 10 is secured at its base 14 to an elongated platform 16. The platform 16 may be secured to a floor 18 as by anchor-bolts.

Mounted on platform 16 are a pair of transversely movable plates 20 and 22 that are mounted on suitable rolls, or linkages, or the like, contained below the surface of platform 16 and not shown inasmuch as the details of construction of devices per se comprise no features that are to be claimed except to the extent that suitable motion responsive means are adapted to drive parts of the recording apparatus 12. Each plate is connected to driving cables 74, 76 (FIG. 5) which may be trained over suitable pulleys (not shown), or the like, up into the standard 10 for driving movable parts therein to render a visible signal through a window 24 of the standard 10.

A vehicle is driven across the movable plates 20 and 22 along a line of travel at a right angle to the longitudinal axis of the platform. The left front wheel 35 of the vehicle travels along a line of travel LF and the right front wheel travels along a line of travel RF over the movable plates 20 and 22. The vehicle is driven so as to first engage a readying lever 26 to zero return the indicating and recording apparatus in a well known manner. A lever 28 is provided for actuation as the left front wheel leaves the platform 16 to operate the card printing device, as hereinafter disclosed. As shown in the drawings, edges 30 and 32 of the platform 16 are tapered so that the wheels can roll onto and off of the platform 16, with left side wheels operating the movable plate 22 thereon.

FIG. 2 is a diagrammatic illustration of the transverse movement of one of the plates 22 as a misaligned wheel 35 is driven thereacross. As the wheel travels along the line LF representing the forward travel of the vehicle with respect to the ground, the wheel will travel along the line LF' with respect to the plate 22, causing it to move transversely to the line of travel LF. It may be seen that the distance D which the plate 22 moves will be dependent on the angle of misalignment of the wheel. The other plate 20 will have moved in the opposite direction if there was toe-in on the right front wheel of the vehicle.

FIG. 3 is representative of the top of the standard 10 and shows a pair of pointers 42 and 44 at the instant of registering a test. As was pointed out briefly above, it is preferred that the actuating lever 26 drive the pointers 42 and 44, and in addition plates 20 and 22 to a predetermined zero position as the wheels to be measured engage the device. When the lever 28 is engaged by the trailing edge of the wheel, a suitable hammer is actuated to print the record of misalignment on a card 46 (FIG. 6), which is inserted in a slot 48 in the apparatus 12. If desired, the operation, as described briefly above, can be fully automatic for indicating alignment of both the front and back wheels of the vehicle.

FIGS. 4 and 5 show the details of construction of the card-marking apparatus 12. A casing 55 forms a support for interior structure described below. The casing 55, on the rear surface, has an opening 56 which is adapted to register with a suitable opening 58 cut into the face of the upper part of the standard 10 so that parts can be operated from cables extending through the lower portion 14 of the standard 10 and beneath the platform 16.

The back surface 57 of the housing 55 is shown as being substantially planar. Accordingly, the same is adapted to abut a flat surface comprising the front or other suitable surface of the standard 10. Of course if the surface is curved or otherwise shaped, it is preferred that there be a shaped adapter collar between the surface 10 and the back surface 57 as well as around the opening 56 to accommodate the flat-back face 57 of the casing 55 and conform to such non-flat surface of standard 10.

The back wall 57 of the casing 55 is suitably apertured to receive a tube 65 welded to and passing through the wall 57. The tube 65 is adapted to serve as a bearing for a drive tube (not shown) connected to a first pulley 66. The interior of the drive tube forms a bearing for a drive rod 68 connected to a second pulley 70. This inner and outer concentric drive means is constructed substantially in the same manner as known as clock-hand driving apparatus. The pulleys 68 and 70 are separated by a suitable spacer bearing 72 to provide convenient spacings for cables 74 and 76 drivingly associated, respectively, with pulleys 68 and 70. Only the back legs of the cables 74 and 76 are shown for purposes of clarity. However, the cables 74 and 76 have two legs to drive the drive tube (not shown) and the drive rod 68, respectively, in opposite senses of rotation to position the marking apparatus in opposite directions. The legs of the cables 74 and 76 are trained around suitable pulleys (or eyelets or other well known guide means, not shown) in a manner to be driven in direction of arrows shown in FIG. 5 by the movable plates 22 and 20, respectively, under toe-in or toe-out conditions of the wheels of a vehicle.

The drive tube and the drive rod 68 are connected, respectively, to rotatable arms 80 and 82. The rotatable arms 80 and 82 carry at their ends parts of the recorder mechanisms, and hereinafter these parts are referred to as anvils 84 and 86, respectively, which may be suitably secured thereto as by stud-welding. Distal ends 88 and 90 of the anvils 84 and 86 carry raised and shaped die surfaces 92 and 94, respectively, for marking, as by imprinting, the impressions 45 on the card 46 (FIG. 6) when force is applied to the card against the surfaces 92 and 94. The surfaces 92 and 94 are shown in position to mark or register impressions 45 substantially in the position shown in FIG. 6. The anvil 86 is backed-up for printing by a stationary elongated support 95 secured by bolts and spacers 96 to the back surface 57 of the casing 55. The anvil 84 is backed-up by the inside surfaces of the back wall 57 of the housing 55. A bounce-back stop plate 97 is also secured by the bolts and spacers 96 inasmuch as all of the moving parts connected to the anvils are kept at a minimum weight to limit the affect of the recording mechanism on the movement of parts responsive to the movement of plates 20, 22.

A card 46 (FIG. 5) is shown in broken lines inserted through the slot 48 in the top 60 of the casing 55. Suitable guide and retainer brackets 100 and 102 for the card 46 are connected together, with the rear-most bracket 102 having an up-turned lower guide surface 104 for receiving the bottom edge of the card 46, and limiting downward movement thereof. The bracket 102 also has a pair of rearwardly extending arms 106 which are fastened, as by welding, to the back surface 57 of the casing 55 to support the brackets 100, 102. Provision might be made to extend the card to a greater or lesser depth into the casing 55 by automatic or manual means to enable more than one set of readings to be made on a card for separate sets of wheels.

To cause the anvils 84 and 86 to mark the indications 45 and 52 (FIG. 6), a movable elongated hammer 110 is provided. The hammer 110 comprises a plate 112 with a flexible surface 113, such as rubber, mounted on a hinged lever arm 120. The backing plate 112 is secured by two or more spaced apart resilient rubber grommets 116 and machine screws 118, only one of which is shown, secured to the lever arm 120. The hammer 110 is arranged to be actuated in the direction of arrow 114 so that the surface 113 engages the right-side surface of the card 46 and expends energy to urge the left-side surface of the card 46 into engagement with the impressing surfaces 92 and 94 of the anvils 84 and 86, respectively. The anvils 86 and 84 will, at the instant of marking the card, be in abutting relationship with the back-up support 95 and inside surface of the back wall 57 of the housing 55. The hammer 110 and the backing plate 112 mounting same are sufficiently sized and shaped to cause impingement on the card by the anvil die surfaces 92 and 94, respectively, to effect printing or punching of the card 46 as desired. It is to be noted that the surface 113 of hammer 110 is fabricated of rubber, or rubber-like material, so as to cause the dies 92 and 94 to penetrate the left-hand surface of the card 46 to a readily discernible and readable depth for defining sharp indicia 45 and 52 (FIG. 6). In addition, it causes the hammer 110 to return to its at rest position as hereinafter described.

The lever arm 120 comprises an angle plate 121 and a backing bracket 124 fastened thereto having outturned ends 126. The ends 126 receive and are fastened as by welding to a rod 128 whose ends are rotatably received by apertures in straps 130 secured to the sides 132 of the housing 55 so as to form bearings for the hammer 112. Each end of the rod 128 has a groove 131 for receiving a snap-on spring retaining washer (not shown). The lever arm 120 is restrained in the position shown because the vertical portion 149 of angle plate 121 is magnetically detented by a permanent magnet 150 attached to the top of housing 55. The magnet 150 attracts and retains the upper edge 152 of the lever plate 120.

The substantially horizontal portion 122 of the angle plate 121 is suitably secured to a drive lever 136 that is arranged to be driven by a compression spring 138 through linkage now to be described. The spring 138 abuts the bottom surface of the lever 136 and surrounds a drive rod 148 passing through an aperture 139 in the lever 136. A flared ferrule 144 is carried by rod 148 and has a flange 142 in abutment with the lower end of spring 138. The ferrule is restrained from downward movement by a cross-pin 146 passing through drive rod 148. Downward movement of the rod 148 with respect to the drive lever 136 is restricted by a cross-pin 149 which passes through the upper end of the rod 148 on the opposite side of the lever 136 and the spring 138. The magnet 150 and spring 138 are so force-effect-related that the end 152 will not leave the position shown in FIG. 5 until the spring 138 is compressed sufficiently by the rod 148 to store the required energy to overcome the force of magnetic attraction between the magnet 150 and the end 152 of the lever plate 120.

The rod 148 is driven by a lever 160 that is pivoted on a post 162 secured to a bracket 164 that is fastened to the side 132 of the housing 55. The interconnection of the rod 148 and the lever 160 is a pivot connection 166 having a set screw 168 in its distal end for adjustably positioning the rod 148 with respect to the pivot 166. The right-hand end of the pivot 166 extends through a hole (not shown) in the lever 160 and a cotter pin (only the head 169 being shown) secures these parts by holding a backing washer (not shown) in light-thrust bearing relationship with the rear surface of the end of the lever 160.

The left-hand end 170 of the lever 160 is suitably secured as by means of a post 172 to a tension cable 174. The cable 174 is adapted to be trained around suitable sheaves (not shown) and connected to the wheel operated lever 28 (FIG. 1) in a conventional and known manner.

When the lever 28 is depressed, as by a wheel passing thereover, the cable 174 will be pulled down in the direction of the arrow shown adjacent the broken-off end thereof. Downward movement of the cable 174 will result in driving the rod 148 upwardly to compress the spring 138. After a predetermined compression of the spring, the magnet pull will be overcome and the end 152 of the lever arm 120 released. The stored energy in the spring will cause the lever arm to swing and cause impact of the hammer 110 with the card against the anvils 92, 94. It is to be noted that the cross-pin 149 and the top end of the rod 148 should be sufficient distance upwardly from the position shown in FIG. 5 so that the anvil can go through a complete path of travel to engage the card 46 and cause impression by the dies 92 and 94 of the hammers 84 and 86, respectively, to place indicia 45 and 52 (FIG. 6) on the card 46.

It is preferred that the lever 28 be gravitationally returnable to the position shown in FIG. 5 when the cable 174 is relieved of tension. The lever returning to its at rest position pushes the spring 138 and rod 148 downward and lever 160 to pivot and draw up the slack in cable 174. It is also anticipated that certain instruments 12 will operate in connection with certain installations more readily if a tension spring, or the like (not shown) be arranged in connection with the lever 160 to return same to approximately the dotted line position 160a whereby the cross-pin 149 will drive the lever 136 downwardly to an extent that the magnet 150 will attract the end 152 of the lever plate 120 to the position shown in FIG. 5.

As explained briefly above, in a preferred use of the invention the lever plate 26, when driven over by a vehicle wheel, returns the movable plates 20 and 22 and indicators to a reference position. From this position, subsequent engagement of a tire with each plate 20 and 22 will cause these plates to be driven sideways to the extent of the misalignment of the plane of rotation of the wheel and the actual path of travel of the vehicle. The cables 74 and 76 associated with these movable plates will drive the arms 80 and 82 to position the marking dies 92 and 94 with respect to the card 46.

With reference again to FIG. 6, it is to be noted that the die marks 45, for the front wheels of the vehicle, indicate a difference in alignment of the wheels with respect to each other. The marks 45 further display different degrees of scuffing as expressed in loss of miles of tire life expressed in miles loss per 1000 miles of driving. Of course, other values such as percent of life or dollar value could be used to best impress different vehicle operators. It is to be noted also that, at different speeds, there are different rates of scuff and accordingly indication selection is heuristically calculated and somewhat arbitrarily ascertained.

The card of FIG. 6 is shown as indicating from zero to a predetermined maximum loss of miles. The range of movement of the plates 20 and 22 driving the marking dies 94 and 92 determines the width of the scale on the card 46. A card, such as that shown in FIG. 6, reading from zero at one extreme and upward, is suitable for certain types of aligning indicating machines.

For other presently used alignment indicating machines, it is preferred to use a different type of card such as illustrated in FIG. 7. The zero position of adjustment for the register indicating dies 88 and 90 is in the center of the card.

While there has been shown and described in detail a presently preferred embodiment of this invention and a convenient manner of operating same, obviously other modifications hereof will occur to others working in the art. Accordingly, it is expressly intended that the invention be not limited to the details hereinabove disclosed, but only by the spirit and scope of the subjoined claims.

What is claimed is:

1. In a vehicle wheel alignment tester for forming a permanent record of the alignment of a vehicle wheel in response to the passage of said wheel along one path, comprising means movable by said wheel a distance corresponding to the misalignment of said vehicle wheel in response to the passage of a vehicle wheel along said one path, die means operated along a predetermined path by said movable means to a position individually corresponding to the misalignment of said vehicle wheel, hammer means substantially coextensive with said path, means for locating a record between said die means and hammer means, and means automatically actuated in response to the passage of said wheel along said one path for controlling said die and hammer means to mark said record in accordance with the die position along said predetermined path.

2. For use in recording the alignment of a vehicle wheel in response to the operation of a vehicle wheel alignment tester having means movable by a first vehicle wheel and means movable by a second vehicle wheel with each means moved a distance individually corresponding to the misalignment of the respective vehicle wheel, the improvement comprising means individual to each wheel operated by the respective movable means for movement along a respective predetermined path to a position individually corresponding to the misalignment of the respective vehicle wheel, means occupying a position in space substantially coextensive with each predetermined path, means for locating a record between each positioned means and said coextensive means, and means automatically actuated by one of said wheels for simultaneously controlling said coextensive means and each said positioned means to mark said record for recording the alignment of each of said vehicle wheels.

3. A vehicle wheel alignment tester adapted to mark a record in correspondence with the alignment of a vehicle wheel in response to the testing of the alignment of said wheel, comprising means movable in accordance with alignment of a vehicle wheel, die means connected with said movable means and driven thereby through a predetermined path of travel, hammer means having a surface positioned generally parallel to said predetermined path of travel, means affording positioning of said record between said die means and the surface of said hammer means, and actuatable means including detented energy storing means for causing said die means and the surface of said hammer means to cooperate and mark said record, said detent energy storing means comprising a magnet, a movable armature attracted and retained by said magnet with a predetermined force, yieldable means for opposing said force, and means for driving said yieldable means to overcome said force.

4. A tester substantially as set forth in claim 3, said hammer means carrying said armature and being detented by said magnet.

5. A tester substantially as set forth in claim 3, said yieldable means being a spring, and said driving means comprising a linkage connected to said spring and drivable by a vehicle wheel.

6. A tester substantially as set forth in claim 4, said yieldable means being a spring, and said driving means comprising a linkage connected to said spring and drivable by a vehicle wheel.

7. A tester substantially as set forth in claim 6, said linkage including means for compressing said spring, and said anvil means including a pivoted lever for resisting compression of said spring to the extent of said force.

8. A tester substantially as set forth in claim 3, the surface of said hammer means being yieldably cooperable with said die means, and the permanent record being a card.

9. A tester substantially as set forth in claim 8, including separate die means for each wheel of a pair of wheels to be simultaneously tested for marking separate impressions on the card whereby to distinguish impressions from each other.

References Cited by the Examiner
UNITED STATES PATENTS

| | | | |
|---|---|---|---|
| 979,585 | 12/1910 | Sokolov | 346—141 X |
| 2,511,763 | 6/1950 | Batt | 346—80 |
| 2,778,707 | 1/1957 | Webster | 346—18 |
| 3,049,990 | 8/1962 | Brown et al. | 101—93 |
| 3,129,516 | 4/1964 | McCormick | 33—203.14 |
| 3,141,726 | 7/1964 | Vogtlin | 346—23 |

RICHARD B. WILKINSON, *Primary Examiner.*

J. W. HARTARY, *Assistant Examiner.*